(12) United States Patent
Selzer

(10) Patent No.: US 8,274,004 B2
(45) Date of Patent: Sep. 25, 2012

(54) SAFETY SYSTEM AND HANDLE MEMBER THEREFOR

(76) Inventor: Donald F. Selzer, Chicora, PA (US)

( * ) Notice: Subject to any disclaimer, the term of this patent is extended or adjusted under 35 U.S.C. 154(b) by 511 days.

(21) Appl. No.: 12/478,006

(22) Filed: Jun. 4, 2009

(65) Prior Publication Data

US 2010/0307908 A1 Dec. 9, 2010

(51) Int. Cl.
*H01H 35/34* (2006.01)
(52) U.S. Cl. .................................................. 200/83 Z
(58) Field of Classification Search ................ 200/83 Z
See application file for complete search history.

(56) References Cited

U.S. PATENT DOCUMENTS

| | | | |
|---|---|---|---|
| 2,708,484 A | 5/1955 | Hoffman |
| 3,585,626 A | 6/1971 | Tartarini |
| 3,942,604 A | 3/1976 | Black, III |
| 4,449,062 A | 5/1984 | Wilson |
| 4,607,199 A | 8/1986 | Krueger et al. |
| 4,608,825 A | 9/1986 | Fontaine |
| 5,344,354 A | 9/1994 | Wiley |
| 5,397,890 A | 3/1995 | Schueler et al. |
| 5,571,970 A | 11/1996 | Mutoh et al. |
| 5,585,785 A | 12/1996 | Gwin et al. |
| 5,834,869 A | 11/1998 | Morgan et al. |
| 5,874,892 A | 2/1999 | Antonellis et al. |
| 5,969,616 A | 10/1999 | Tschoi |
| 6,105,348 A | 8/2000 | Turk et al. |
| 6,341,479 B1 | 1/2002 | Scag et al. |
| 6,501,281 B1 | 12/2002 | Rundo |
| 6,951,092 B2 | 10/2005 | Busboom et al. |

*Primary Examiner* — Briggitte R Hammond
(74) *Attorney, Agent, or Firm* — Eckert Seamans Cherin & Mellott, LLC; Stephen A. Bucchianeri

(57) ABSTRACT

A fluidic operator presence control and safety system for walk-behind and riding equipment, such as lawn mowers and the like, is provided. The system includes a first handle member mounted to a portion of the equipment, the first handle member having an internal fluid flow channel containing a fluid therein, the fluid flow channel being closed to the environment. The system further includes a first electrical switch mounted adjacent the fluid flow channel and interacting therewith. The first electrical switch being in physical communication with the fluid flow channel so that pressure variances transmitted by the fluid within the fluid flow channel as a result of manual compression of a portion of the first handle member are conveyed through the internal fluid flow channel to the first electrical switch thereby actuating the first electrical switch for enabling operation of one or more functions of the equipment.

10 Claims, 10 Drawing Sheets

SAFETY SYSTEM AND HANDLE MEMBER THEREFOR

FIELD OF THE INVENTION

The invention generally pertains to automatic shut-off safety systems for mechanical equipment, and, more particularly, to an operator presence control and shut-off fail-safe system for walk-behind and riding equipment such as lawn and garden equipment and the like. The invention also pertains to a handle member for use in automatic shut-off systems.

BACKGROUND OF THE INVENTION

The design of current walk-behind and riding equipment such as lawn and garden equipment for both residential and commercial use includes a range of features to improve use, efficiency and safety. Among such features are ergonomically designed controls, levers, handles and grips, more efficient engines that provide increased power but lessen the discharge of pollutants, and built-in automatic safety features that generally immediately stop the operation of the piece of equipment thus obviating the need of the operator to undertake a series of actions for bringing the equipment to a halt.

With regard to the design of walk-behind rotary blade mowers the general design is to incorporate a pivotal bar member as part of the mower handle assembly. The pivotal bar member can be adapted to swing upward or downward away from the mower handle assembly when released by the operator, thus interrupting the electrical circuit to the mower's engine and thereby causing the engine to stop. In order to complete the electrical circuit for engaging the mower's engine, the operator swings the pivotal bar member adjacent to the mower handle assembly to the run position, and then grips and holds both elements with his or her hands, thereby initiating operation of the mower. In such arrangement, the pivotal bar member must be continuously held adjacent the mower handle assembly by the operator in order to maintain the operation of the mower. Release of the pivotal bar member by the operator causes the spring-biased pivotal bar member to swing away from the mower handle assembly, thus opening the electrical circuit and immediately stopping the mower. A primary advantage of this type of safety system is that while the operator's presence is required to initiate the safety feature and stop the operation and running of the mower, it is not necessary for the operator to perform a complex series of steps or procedures in order to bring the equipment to a halt.

Although such safety systems have been generally effective for their intended purposes, there still exists room for improvement.

SUMMARY OF THE INVENTION

In accordance with an embodiment of the invention, a fluidic operator presence control and safety system for walk-behind and riding equipment, such as lawn mowers and the like, is provided. The system comprises a first handle member mounted to a portion of the equipment, the first handle member having an internal fluid flow channel containing a fluid therein, the fluid flow channel being closed to the environment. The system further comprising a first electrical switch mounted adjacent the fluid flow channel and interacting therewith. The first electrical switch being in physical communication with the fluid flow channel so that pressure variances transmitted by the fluid within the fluid flow channel as a result of manual compression of a portion of the first handle member are conveyed through the internal fluid flow channel to the first electrical switch thereby actuating the first electrical switch for enabling operation of one or more functions of the equipment.

The portion of the equipment may comprise a distal end of a first handlebar. The first electrical switch may be normally in an open position whereupon application of pressure against a portion of the first handle member increases the pressure of the fluid within the internal fluid flow channel and thereby transmits the fluid pressure increase to the first electrical switch causing the switch to close and enabling the one or more functions of the equipment; and release of the applied pressure causes the fluid pressure to return to its normal level resulting in the opening of the switch and an immediate halt to the one or more functions of the equipment.

The first electrical switch may comprise: a switch plate, a flexible diaphragm adjacent the switch plate, and a pair of contacts. The diaphragm may move the switch plate into and out of contact with the pair of contacts in response to the application and release of pressure to the handle member. The first electrical switch may comprise wires extending therefrom, the wires providing a signal of opening and closing of the first electrical switch to an electrical circuit of the equipment.

The internal fluid flow channel may comprise a reservoir portion in fluid flow communication with the internal fluid flow channel, the reservoir having a flexible diaphragm forming a portion of a side of the reservoir. The first electrical switch being disposed adjacent the diaphragm such that movement of the diaphragm in response to pressure changes in the fluid causes the first electrical switch to open or close.

Any failure of the system may cause the first electrical switch to revert to the normally open position. The handle member may be removably securable to the first handlebar. The portion of the first handle member may include a touch sensitive area for conveying the operator-applied pressure to the internal fluid flow channel.

The system may further comprise a second handle member mounted to another portion of the equipment. The second handle portion may have a second internal fluid flow channel for containing therein a fluid, the second fluid flow channel being closed to the environment. The second handle portion may further have a second electrical switch mounted adjacent the second fluid flow channel and interacting therewith, the second electrical switch being in physical communication with the second fluid flow channel so that pressure variances transmitted by the fluid within the second fluid flow channel as a result of manual compression of a portion of the second handle member are conveyed through the second internal fluid flow channel to the second electrical switch thereby actuating the second electrical switch for enabling the one or more functions of the equipment. The other portion of the equipment may comprise a distal end of a second handlebar. Movement of one of the first electrical switch and the second electrical switch to the open position may result in an immediate halt of the one or more functions of the equipment. Movement of both the first electrical switch and the second electrical switch to the open position may result in an immediate halt of the one or more functions of the equipment.

In accordance with another aspect of the invention, a handle member for use with an operator presence control and safety system for walk-behind and riding equipment, such as lawn mowers and the like, is provided. The handle member comprises: an internal fluid flow channel containing a fluid therein, the fluid flow channel being closed to the environment; and an electrical switch mounted adjacent the fluid flow channel and interacting therewith. The first electrical switch being in physical communication with the fluid flow channel so that pressure variances transmitted by the fluid within the fluid flow channel as a result of manual compression of a portion of the handle member are conveyed through the internal fluid flow channel to the first electrical switch thereby actuating the first electrical switch for enabling operation of one or more functions of the equipment.

The electrical switch may normally be in an open position whereupon application of pressure against a portion of the handle member increases the pressure of the fluid within the internal fluid flow channel and thereby transmits the fluid pressure increase to the electrical switch causing the switch to close and enabling the one or more functions of the equipment; and release of the applied pressure causes the fluid pressure to return to its normal level resulting in the opening of the switch and an immediate halt to the one or more functions of the equipment.

The electrical switch may comprise: a switch plate, a flexible diaphragm adjacent the switch plate, and a pair of contacts. The diaphragm may move the switch plate into and out of contact with the pair of contacts in response to the application and release of pressure to the handle member. The electrical switch may comprise wires extending therefrom, the wires being structured to provide a signal of opening and closing of the first electrical switch to an electrical circuit of the equipment.

The internal fluid flow channel may comprise a reservoir portion in fluid flow communication with the internal fluid flow channel, the reservoir having a flexible diaphragm forming a portion of a side of the reservoir. The electrical switch may be disposed adjacent the diaphragm such that movement of the diaphragm in response to pressure changes in the fluid causes the first electrical switch to open or close. Any failure of the handle member may cause the electrical switch to revert to the normally open position. The handle member may be structured to be removably secured to a handlebar of the equipment.

In accordance with a further aspect of the invention, a handle member for use with an operator presence system for a piece of equipment is provided. The handle member comprises: an internal fluid flow channel containing a fluid therein, the fluid flow channel being closed to the environment; and an electrical switch mounted adjacent the fluid flow channel and interacting therewith. The first electrical switch being in physical communication with the fluid flow channel so that pressure variances transmitted by the fluid within the fluid flow channel as a result of manual compression of a portion of the handle member are conveyed through the internal fluid flow channel to the first electrical switch thereby actuating the first electrical switch for enabling operation of one or more functions of the piece of equipment.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

FIGS. 1 through 18 illustrate embodiments of an operator presence control failsafe system for mechanical equipment, with special utilization on lawn and garden equipment, and primarily riding or walk-behind lawn mowers.

Figure 1:
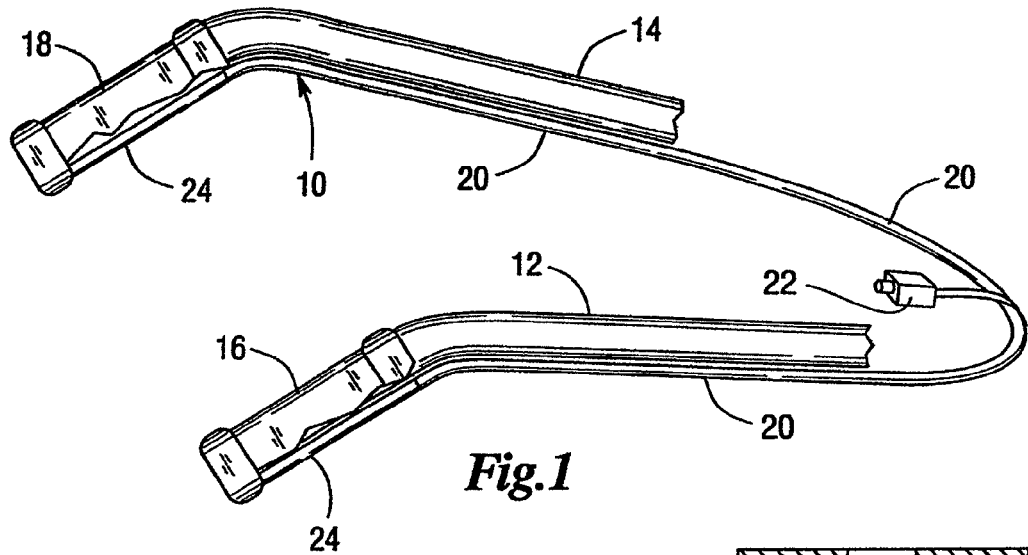
FIG. 1 is a perspective view of an operator presence control and fail-safe system of the present invention.

The embodiment illustrated in FIG. 1 includes a lawn mower assembly having a pair of spaced-apart handlebars 12 and 14 terminating at their respective distal outer ends with molded handle portions 16 and 18. A length of flexible, elongated tubing 20 having a substantially narrow diameter is partially inserted within, and interconnected to, each handle portion 16 and 18. Each length of tubing 20 extends along the respective handlebars 12 and 14 to an electrical switch assembly 22. Contained within tubing 20 is a compressible fluid such as synthetic motor oil, as discussed further below. The operator presence control system shown in FIG. 1 defines a fail-safe system closed off from the external environment. With specific reference to handle portion 18, the length of tubing 20 includes a linear section 24 that is secured to, and enclosed within, handle portion 18. Handle portion 16 includes a similar linear section 24 secured to, and enclosed therein (not shown).

As illustrated in FIG. 1, handle portion 18 is comprised of tubular linear section 24 tightly fitted on handlebar 14 and is composed from a compressible plastic material that permits tubular linear section 24 to be squeezed and constricted through slight manual pressure, specifically the application of hand pressure exerted by the lawn mower operator. The application of manual pressure to tubular sleeve sections 24 alters the fluid pressure contained within tubing 20, and thus switch 22 is actuated in response to the sensed pressure variance. In a like manner, compressible handle portion 16 is structurally identical to compressible handle portion 18, so that manually applied hand pressure by the operator to handle portion 18 also alters the fluid pressure within tubing 20 causing switch 22 to respond.

During use of the lawn mower, the operator would manually grasp handle portions 16 and 18 with each hand. The pressure applied by the operator's hands on the resilient areas, the touch sensitive areas of handle portions 16 and 18, is conveyed by the fluid through tubing 20 as an increase in fluid pressure throughout the system. Tubing 20 is connected to, and in flow communication with, the switch assembly 22, and thus the increase in fluid pressure actuates the switch 22 to complete the operative electrical circuit to the lawn mower engine thus enabling the engine to maintain continuous operation. The operator's hand contacting either handle portion 16 or 18 alone will provide sufficient pressure against either linear tubular section 24 to cause the requisite fluid pressure increase within the tubing 20 thereby actuating the normally open contacts of switch 22 to move to the closed operative position. Conversely, when the operator removes his hands from handle portions 16 and 18 the pressure variance within the system returns the fluid pressure to a predetermined normal level. This return to normal pressure level causes the electrical contacts within switch 22 to open thereby instantly interrupting the electrical circuit to the lawn mower's engine and immediately halting engine operation.

Thus, the operator presence control and fail-safe system of FIG. 1 controls the engine operation of the lawn mower wherein pressure exerted on handle portions 16 and 18 indicates to the system that an operator is present and continued application of manual pressure actuates switch 22. Switch 22 is interconnected to the electrical system of the lawn mower's engine in such a manner as to halt engine operation if the operator is not present as determined by the operator's manual contact established by the operator's hand contacting and gripping the touch sensitive areas of at least one of handle portions 16 or 18.

Figure 2:
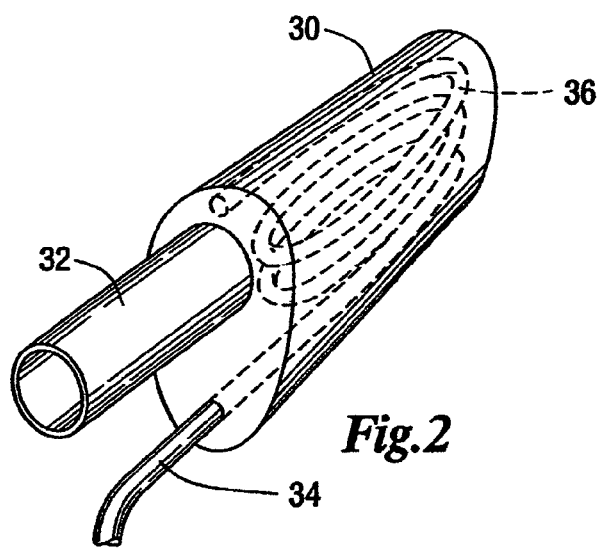
FIG. 2 is a perspective view of an operator presence control and fail-safe system of the present invention illustrating one configuration for an internal fluid flow channel contained within the handle portion.
Figure 3:
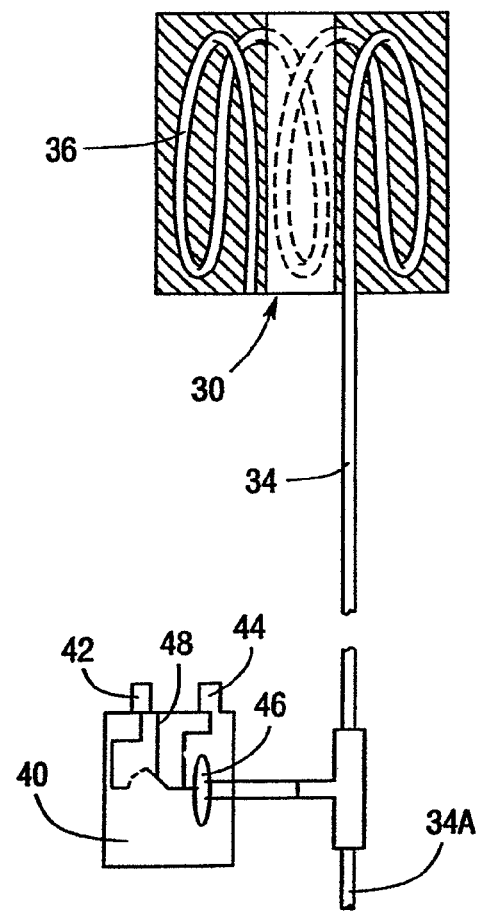
FIG. 3 is a schematic view of an operator presence control and fail-safe system illustrating the interconnections of the handle portion and fluid flow channel with an electrical switch.

FIGS. 2 and 3 illustrate another embodiment of the operator presence control and fail-safe system shown in FIG. 1 that provides an enhanced sensitivity for the system. Specifically, FIG. 2 shows a resilient outer handle portion having the configuration of a compressible sleeve 30 securely mounted on a handlebar 32 of a piece of lawn and garden equipment, and preferably a walk-behind lawn mower. A piece or length of elongated, flexible tubing 34 is interconnected to sleeve 30 and extends outwardly therefrom. Tubing 34 is in fluid flow communication with an internal channel 36 formed within sleeve 30. FIG. 3, in-part, shows sleeve 30 cut open and laid flat to better illustrate the configuration of internal channel 36. Channel 36 shown in FIG. 3 is formed or molded in a continuous zigzag pattern and is fully enclosed within the interior of sleeve 30. The configuration of internal channel 36 can also be in the form of a helix that essentially encompasses handlebar 32.

In order to enhance the sensitivity of the operator presence control system of FIGS. 2 and 3, sleeve 30 is mounted circumjacent handlebar 32, as shown in FIG. 2, so that a portion of interior channel 36 is adjacent to, and underlies any selected external surface point on sleeve 30. Thus, any slight manual pressure, even pressure resulting from a relatively light touch from the operator's hand, will cause the adjacent underlying section of internal channel 36 to be constricted thereby affecting the overall fluidic pressure within channel 36 and tubing 34.

The operator presence control and fail safe system illustrated in FIG. 3 also includes an electrical switch 40 having electrical wire terminal posts 42 and 44. Disposed within switch 40 is a diaphragm 46 that is responsive to variations in fluid pressure occurring within tubing 34. Such fluid pressure variations cause a pivotal electrical contact member 48 to undergo a "make and break" action to open or close switch 40. Tubing 34, illustrated in FIG. 3, also includes a portion or length 34a that leads to a second handlebar (not shown) that has a structure and operative capability identical to handlebar 32 shown in FIGS. 2 and 3.

It should be noted that the plastic material from which compressible sleeve 30 is formed must be of a composition that is impervious to leakage of fluid from channel 36 through the sidewall of sleeve 30 so that the long term use of the system will not be compromised through continuous use. Reliability and durability of the material components of the system is of critical importance in order to insure long-term use of the system for a number of years. In addition, the material components must also be resistant to degradation or failure due to extreme temperature or weather variations or other extremes, such as elevation or atmospheric pressure variations. Moreover, it is intended that any failure of the system for any reason will result in the system operating in a fail-safe mode under which switch 40 will revert to the normally open position whereupon the engine of the lawn mower will immediately and automatically halt bringing the lawn mower to a stop. This fail-safe mode also applies to the system shown in FIG. 1.

Depending on the desired operating conditions, the fluid being utilized in the operator presence control and fail safe systems of FIGS. 1 through 18 may be air, an inert gas, or a suitable selected liquid. Thus, the system may be pneumatic or hydraulic so long as the fluid is compatible with material components and the desired operating characteristics of the system in its several embodiments. Moreover, all of the operator presence control systems—air, inert gas, liquid, or fluid—are closed systems, not open to the environment. The systems disclosed in FIGS. 1 through 18 are designed to operate in temperature conditions that range from −20 degrees Fahrenheit through 120 degrees Fahrenheit. For use in such varied temperatures, it has been found that synthetic motor oils, e.g., without limitation, Mobil 1 synthetic motor oil, are very effective for such use due to a very low coefficient of expansion (approx. 0.00044 in$^3$/° F.) compared to other possible fluids.

Figure 4:
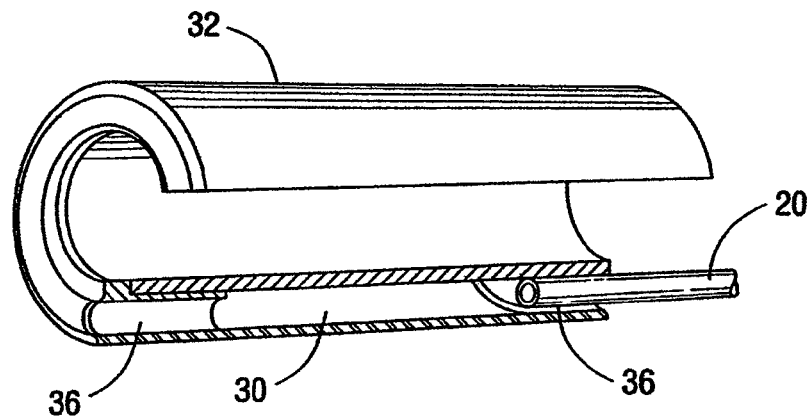
FIG. 4 is a perspective view of a compressible sleeve with a portion of the sleeve cut-away to reveal the internal fluid flow channel.
Figure 5:
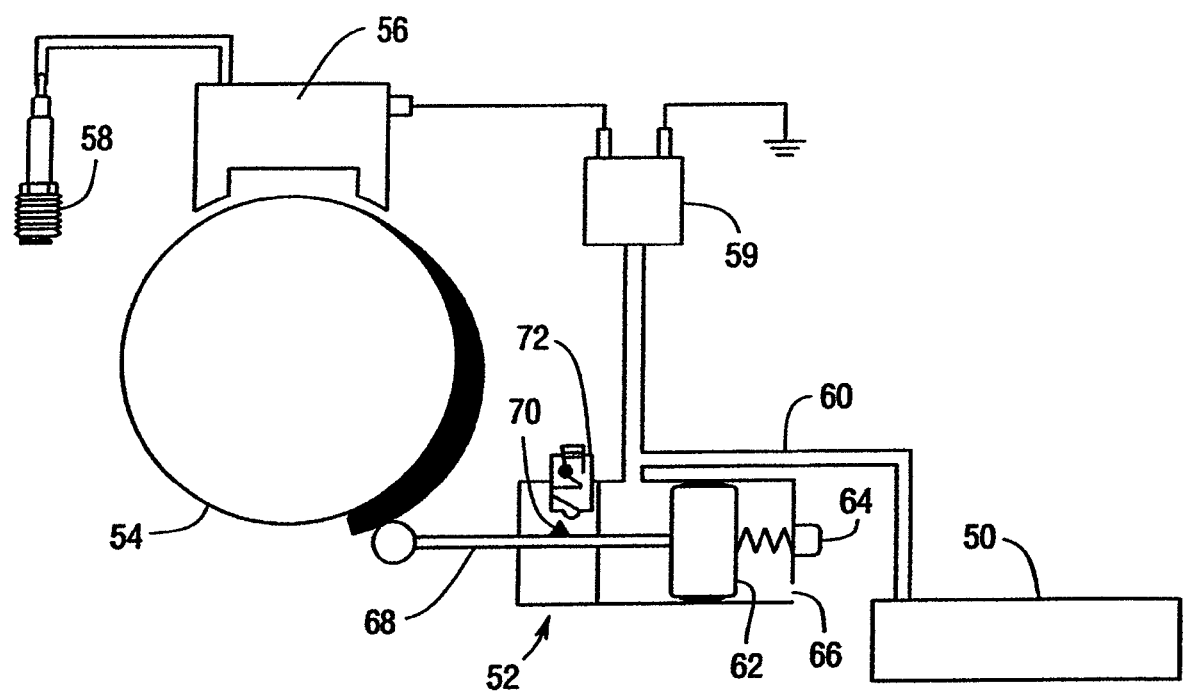
FIG. 5 is an elevational view of another embodiment of an operator presence control and fail-safe system using a brake actuator and flywheel for controlling the operation-of the piece of equipment.

It should also be noted, as specifically shown in FIG. 4, that the touch sensitive area of sleeve 30 and handle portions 16 and 18 need not completely encompass handlebars 12, 14 and 32 the full 360 degrees. The touch sensitive area or gland area as primarily defined by internal fluid channel 36 need only have an area of 160 degrees for providing the operator with a touch sensitive area to exert manual pressure there against.

FIGS. 5 through 8 illustrate another embodiment of the fluidic operator presence control fail safe system shown in FIGS. 1 through 4 which functions by the same basic principles but utilizes additional structural elements not used in the system shown in FIGS. 1 through 4. The system of FIGS. 5 through 8 includes a fluidic operator presence control handle 50 having similar internal components as handle portions 16 and 18 and sleeve 30. Handle 50 is in flow communication with a brake actuator 52 that in turn engages, in response to pressure variances occurring within the system, a flywheel 54. Flywheel 54 is interconnected with an electrical ignition 56, spark plug 58 and a neutral control pressure switch 59.

Figure 6:
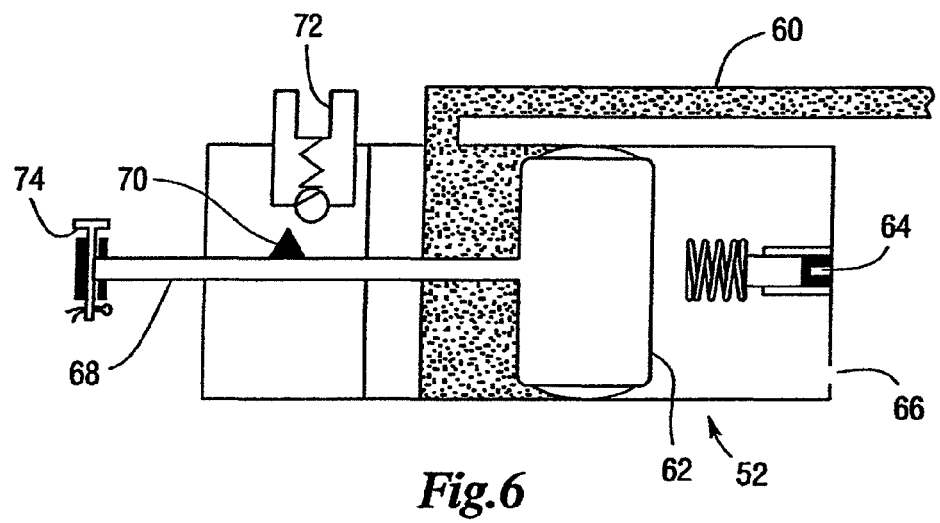
FIG. 6 is an enlarged sectioned elevational view of the brake actuator shown in FIG. 5 illustrating additional internal components of the brake actuator.
Figure 7:
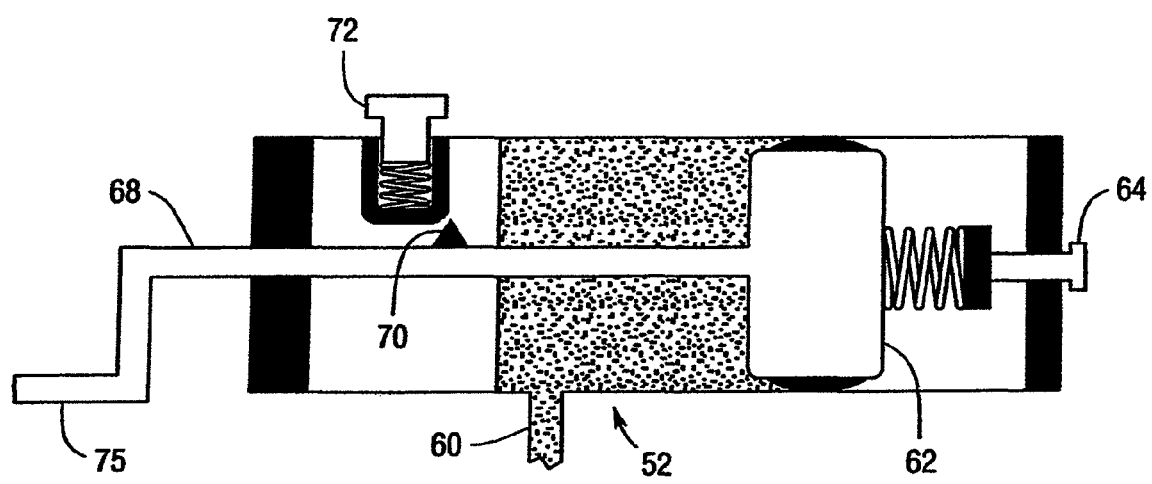
FIG. 7 is an enlarged sectioned elevational view of the brake actuator shown in FIG. 5 illustrating the disposition of the internal components when the brake actuator is in the set position.
Figure 8:
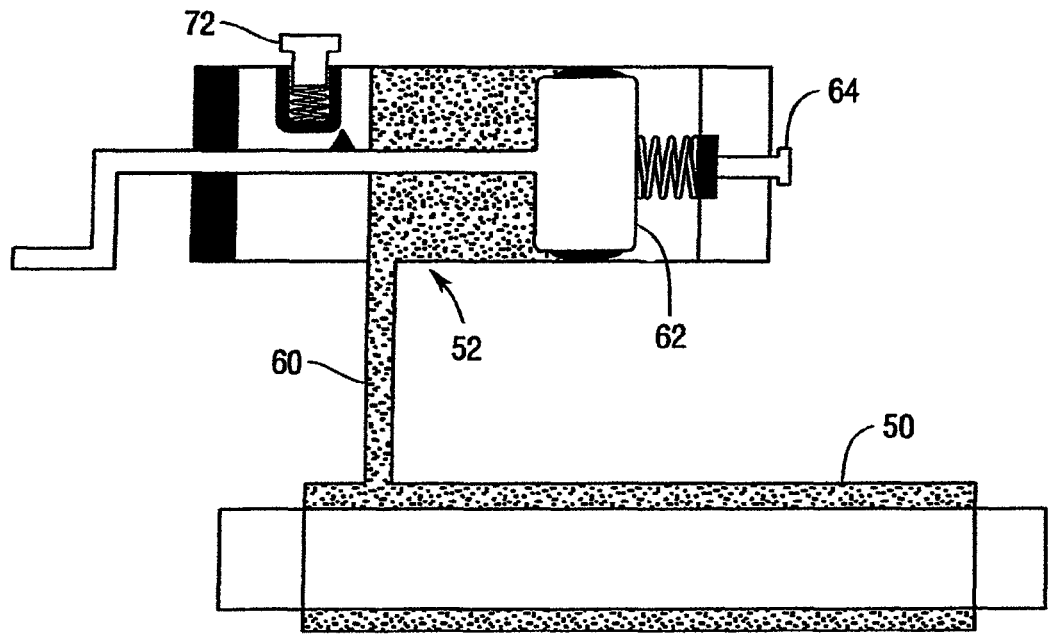
FIG. 8 is an enlarged sectioned elevational view of the brake actuator shown in FIG. 5 illustrating the interconnection of the brake actuator to the operator presence control handlebar of the lawn mower.

FIGS. 6 through 8 illustrate further components of the system. A fluid inlet 60 registers with the cylinder of brake actuator 52 for permitting ingress and egress of fluid flow dependent upon the pressure level and pressure variations existing within the system. A piston 62 is slidably mounted within brake actuator 52 for slidable movement therein and can be adjusted by a return spring adjustment member 64. The cylinder is also provided with a filtered vent 66 for maintaining operational efficiency of brake actuator 52. A brake ram 68 is mounted to piston 62 and travels therewith in the cylinder of brake actuator 52 while a portion of brake ram 68 extends outwardly from brake actuator 52 for selectively engaging flywheel 54. A set pin 70 and touch sensitive adjustment member 72 are also used to set and adjust the piston 62 stroke and engagement point for brake actuator 52. FIG. 6 shows an alternative manner of mounting brake ram 68 to a clevis pin 74 that would be interconnection to the engine of the lawn mower while in FIG. 8 brake ram 68 is connected to a brake lever 75.

In operation, the user would apply manual pressure to handle 50 by squeezing handle 50 with his hand. Such action would create and transmit a pressure variance within the system that, in turn, will cause brake ram 68 to move past set pin 70. Brake ram 68 attaches to brake lever 75, and as brake ram 68 is pulled away from flywheel 54 the engine will be allowed to rotate. Once brake actuator 52 is set, the user will only need to maintain a touch sensitive pressure against handlebar 50 for continuing to allow engine rotation. However, when the user removes or releases his hands from handlebar 50 fluid pressure within the system will return to the normal level thereby allowing the slidable movement of brake ram 68 in the opposite direction thereby displacing brake ram 68 for contact against flywheel 54 and halting engine rotation.

It should be noted that the fluidic operator presence control and safety systems illustrated in FIGS. 1 through 9 may also be utilized with only one handle portion 16, compressible sleeve 30, or fluidic operator presence control 50 mounted to anyone of the respective handlebars 12, 14 or 32, for example. In addition, only a single length of tubing, such as tubing 20 or 34, would extend outwardly therefrom for interconnection to electrical switch 22 or 40. Manual pressure applied to only one handle portion 16 or sleeve 30 would induce a pressure variance within the respective systems for actuating switches 22 or 40 in the same manner as afore described for two mounted handle portions 16 and 18 or compressible sleeves 30.

Figure 9:
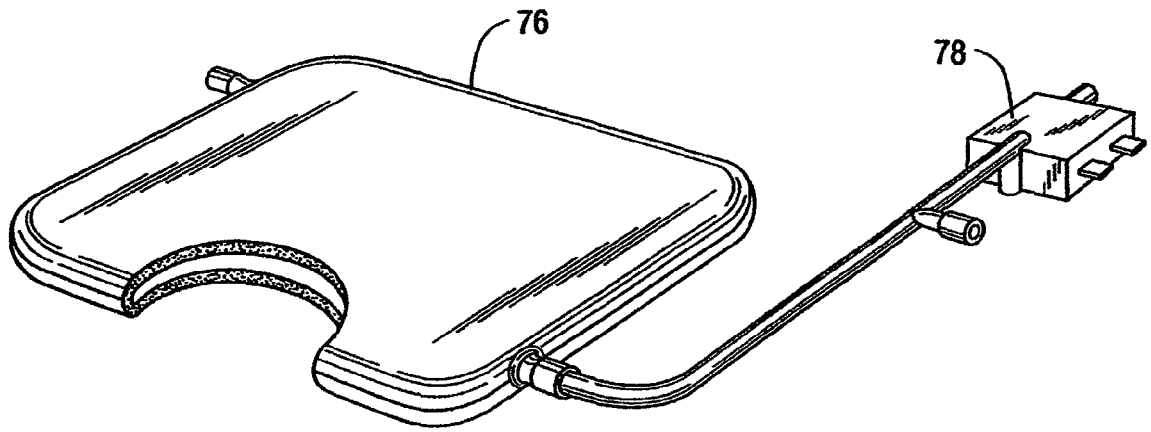
FIG. 9 is a perspective view of another embodiment of the fluidic operator presence control system utilizing a compressible bladder in flow communication with a switch.
Figure 10:
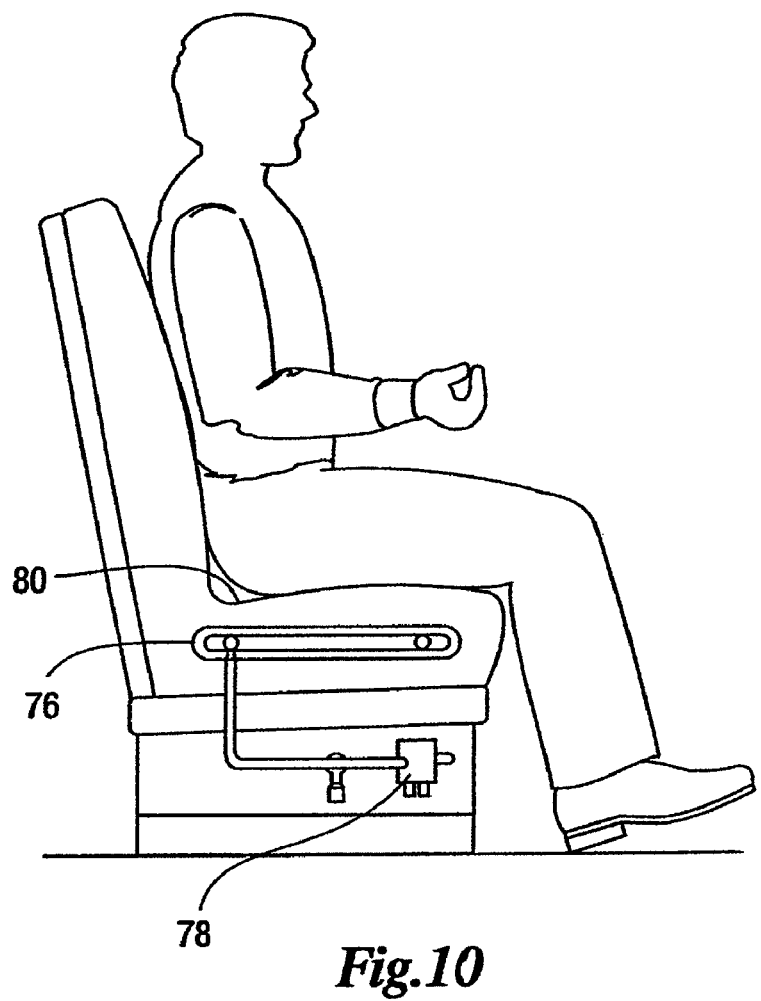
FIG. 10 is an elevational view of the compressible bladder illustrating the disposition of the compressible bladder within the seat of a riding lawn and garden mower.
Figure 11:
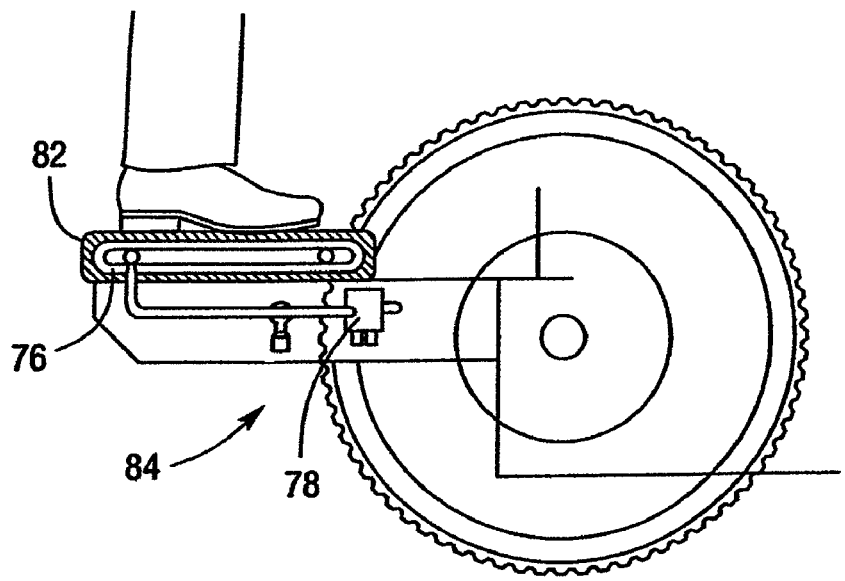
FIG. 11 is an elevational view of the compressible bladder illustrating the disposition of the bladder on the pedal of a lawn and garden mower.

FIGS. 9 through 11 illustrate another embodiment of a fluidic operator presence control and fail-safe system utilizing a compressible bladder 76 that functions in accordance with the same principles as disclosed with regard to the systems of FIGS. 1 through 8. Compressible bladder 76, shown in FIG. 9, is connected to, and in flow communication with, a switch 78. In FIG. 10, bladder 76 is shown as being disposed within or as part of seat 80 for the operator. In FIG. 11, bladder 76 is shown as being incorporated into foot pedal 82 of the piece of machinery 84 the operator is driving. In both cases bladder 76 will function in the same manner as the compressible elements disclosed in the systems of FIGS. 1 through 8 with regard to the application of manual pressure thereto and the subsequent creation of pressure variances that are transmitted throughout the system for both maintaining engine operation and for immediately halting engine operation.

Figure 12:
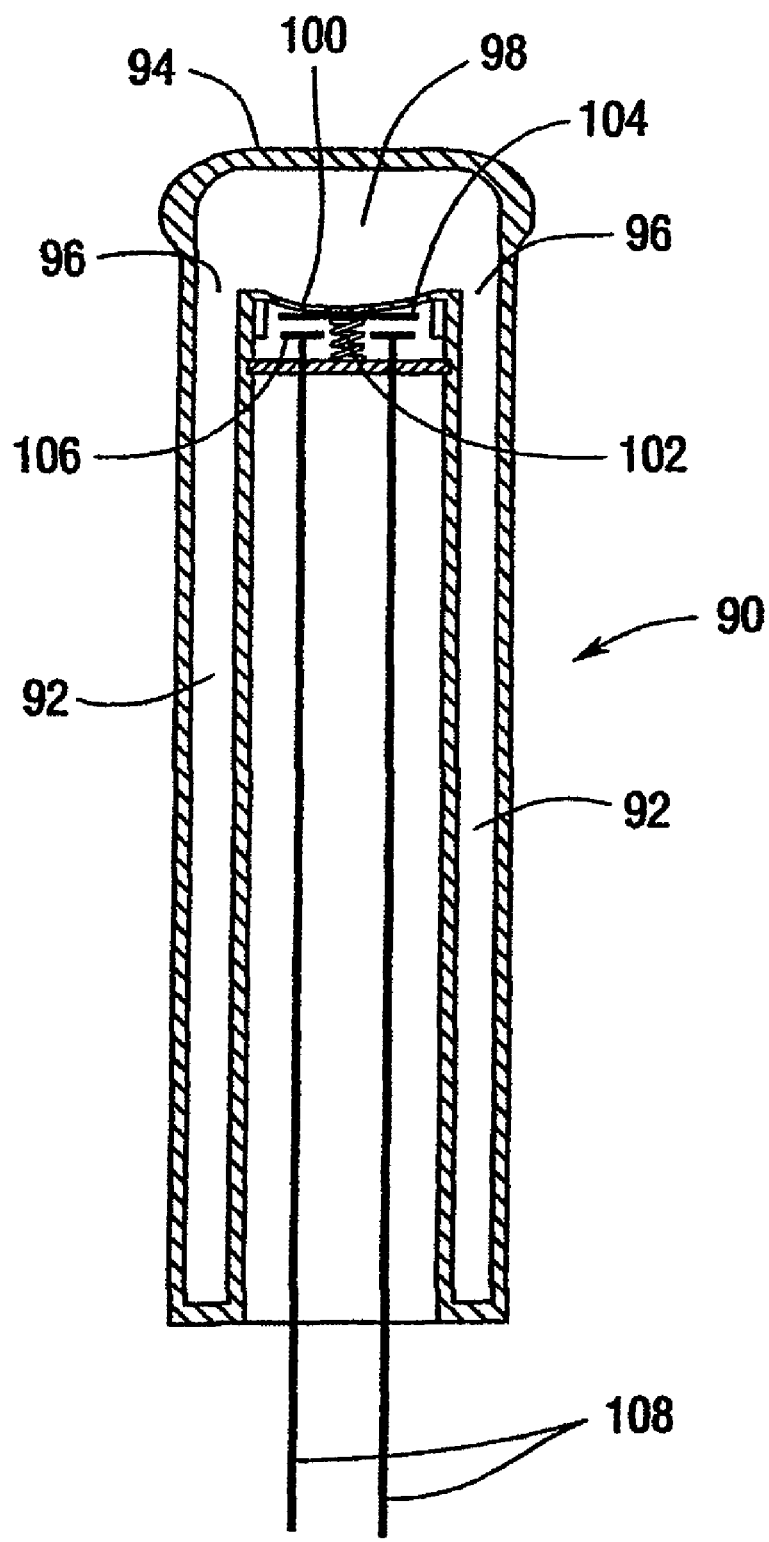
FIG. 12 is an enlarged sectioned elevational view of the compressible sleeve of a single handle system cut away to reveal the internal fluid flow channel and an internal electrical switch to be actuated by pressure change on the sleeve to actuate the brake.
Figure 13:
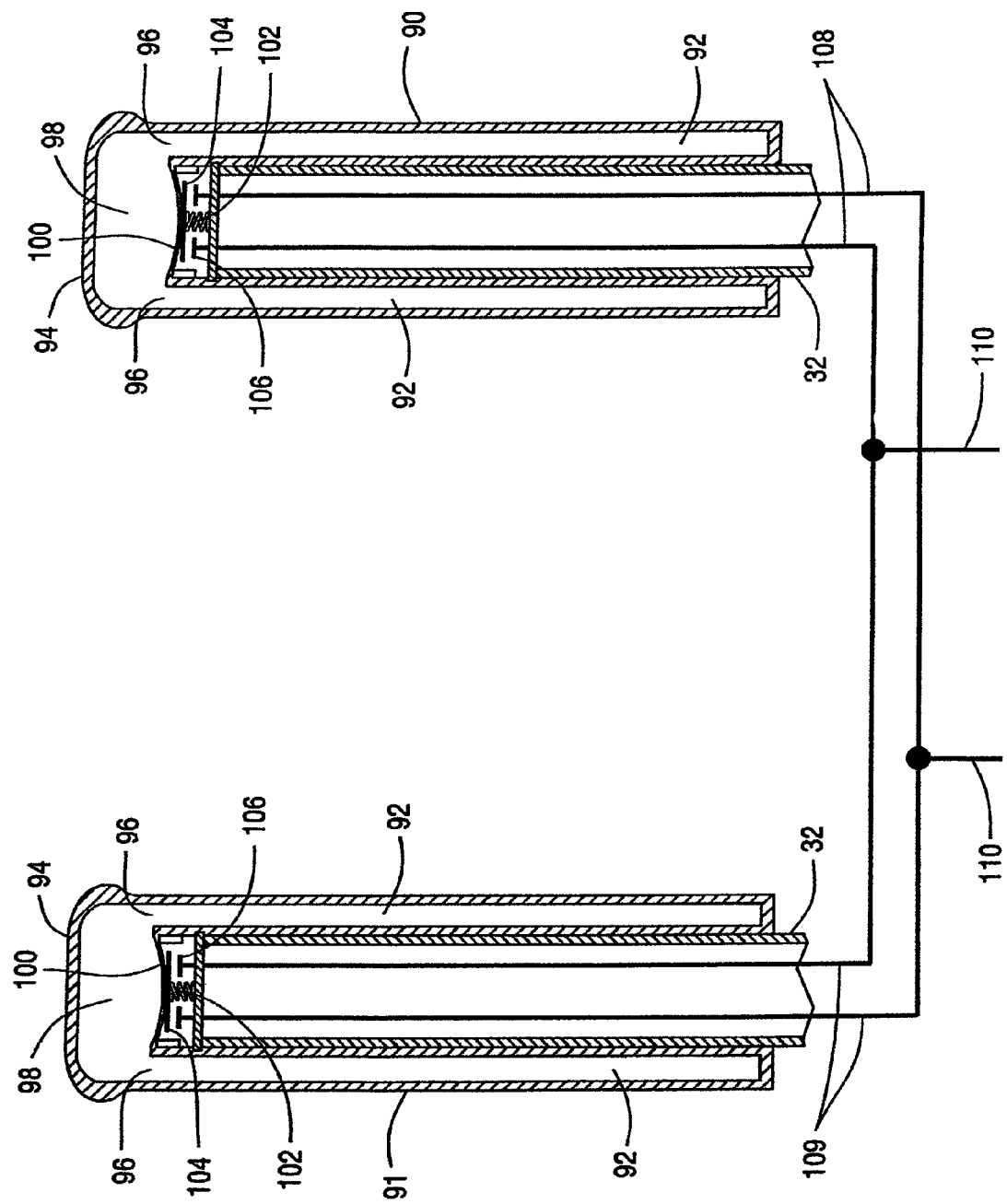
FIG. 13 is an enlarged sectioned elevational view of the compressible sleeves of a two handle system to reveal the internal fluid flow channels and internal electrical switches to be actuated by pressure change on either sleeve to actuate the brake.

FIGS. 12 and 13 illustrate another embodiment of a fluidic operator presence control and fail-safe system utilizing internal switching where electrical switch 101 is located inside first handle portion 90, and in a two-switch system, electrical switches 101 are located inside first handle portion 90 and second handle portion 91. FIG. 12 illustrates a single handle system, which would be particularly suited for use with home or consumer equipment. FIG. 13 illustrates a two-handle system, which would be particularly suited for use with commercial or industrial equipment.

The system shown in FIG. 12 has a first handle 90, having fluid cavities 92 extending at least along a portion of the length of handle 90, and extending around at least a portion of the circumference of handle 90. Distal end 94 of first handle 90 has a manifold 96, which is in flow connection with the fluid cavity or cavities 92, allowing flow from the fluid cavity or cavities 92 to reservoir 98 in distal end 94 of handle 90. Flexible diaphragm 100 extends across at least a portion of an internal side 99 of reservoir 98. Diaphragm 100 is moved inwardly and outwardly in response to increases and decreases of the manual pressure applied to handle 90.

Electric switch 101 in first handle 90 consists of spring 102, which normally holds switch plate 104 out of contact with switch contacts 106 preventing the engine from operating when manual pressure is applied to fluid cavity 92, the fluid is pressurized throughout the system, diaphragm 100 pushes switch plate 104 into contact with switch contacts 106 closing switch 101 and the engine is operable. When manual pressure is released, diaphragm 100 returns to its normal position, switch contacts 106 break contact with switch plate 104, the engine is immediately stopped and the equipment is immediately stopped.

In the embodiment shown in FIG. 13, first handle 90 has first wires 108 running from electric switch 101 to brake actuator 52. When first handle 90 and second handle 91 are used, first wires 108 and second wires 109 run from their respective electrical switches 101 in first handle 90 and second handle 91 to a common point where the respective first wires and second wires are joined to third wires 110, which extend to brake actuator 52.

Two-handle systems may be wired in series to require both hands of the operator manually pressurizing both handles to run the equipment (not shown) or in parallel to require the operator manually pressurizing at least one handle (shown in FIG. 13). Thus, in the series wired set-up, release of either handle will stop the motor and equipment immediately, and in the parallel wires set-up, both handles must be released in order for the equipment to be stopped.

FIGS. 14 through 18 illustrate another embodiment of a fluidic operator presence control and fail-safe system utilizing internal switching where electrical switch 122 (FIGS.

16-17) is integrated within a first handle member 120, and in a two-switch system (FIG. 18) where electrical switches 122 are integrated within a first handle member 120 and a second handle member 121. The single handle system, illustrated in FIGS. 14-17 would be particularly suited for use with home or consumer equipment. The two-handle system illustrated in FIG. 18 would be particularly suited for use with commercial or industrial equipment.

Figure 14:
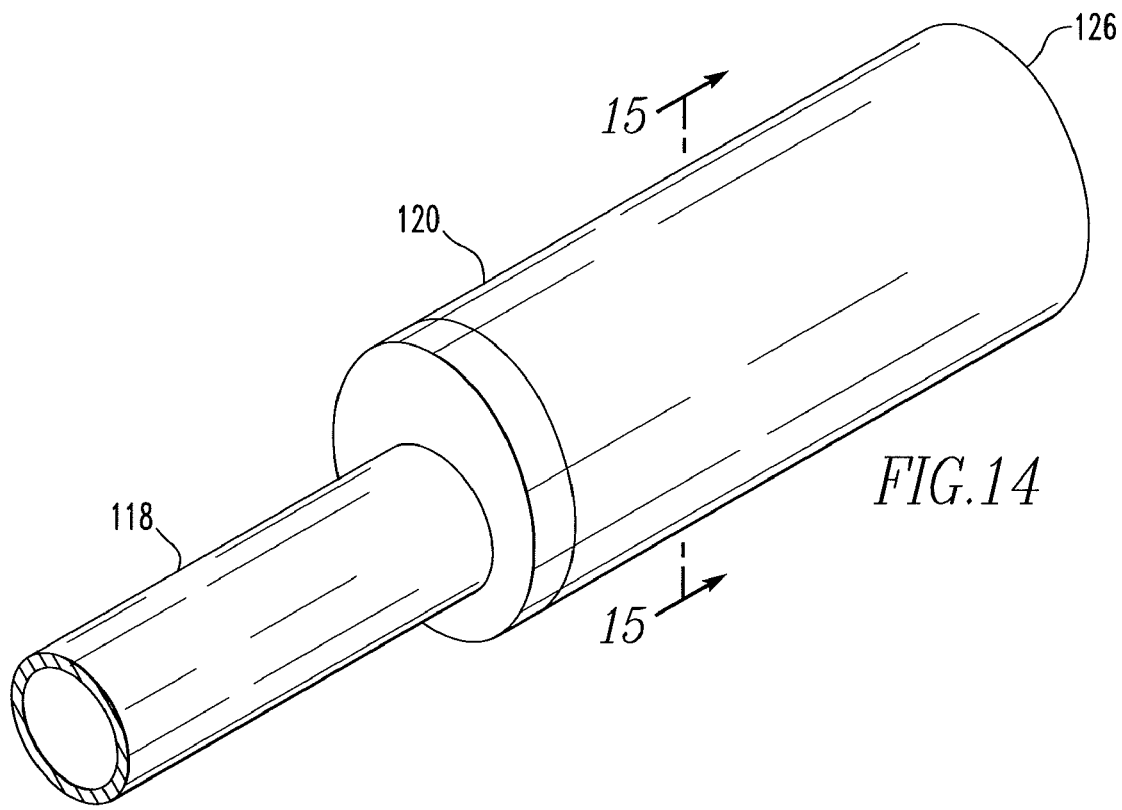
FIG. 14 is a perspective view of another embodiment of an operator presence control and fail-safe system utilizing a single compressible sleeve having an internal electrical switch.
Figure 15:
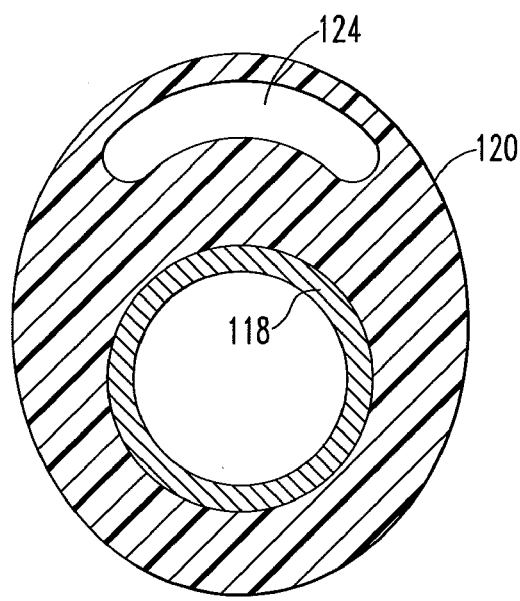
FIG. 15 is a sectional view along line 15-15 of the compressible sleeve of the system shown in FIG. 14.
Figure 16:
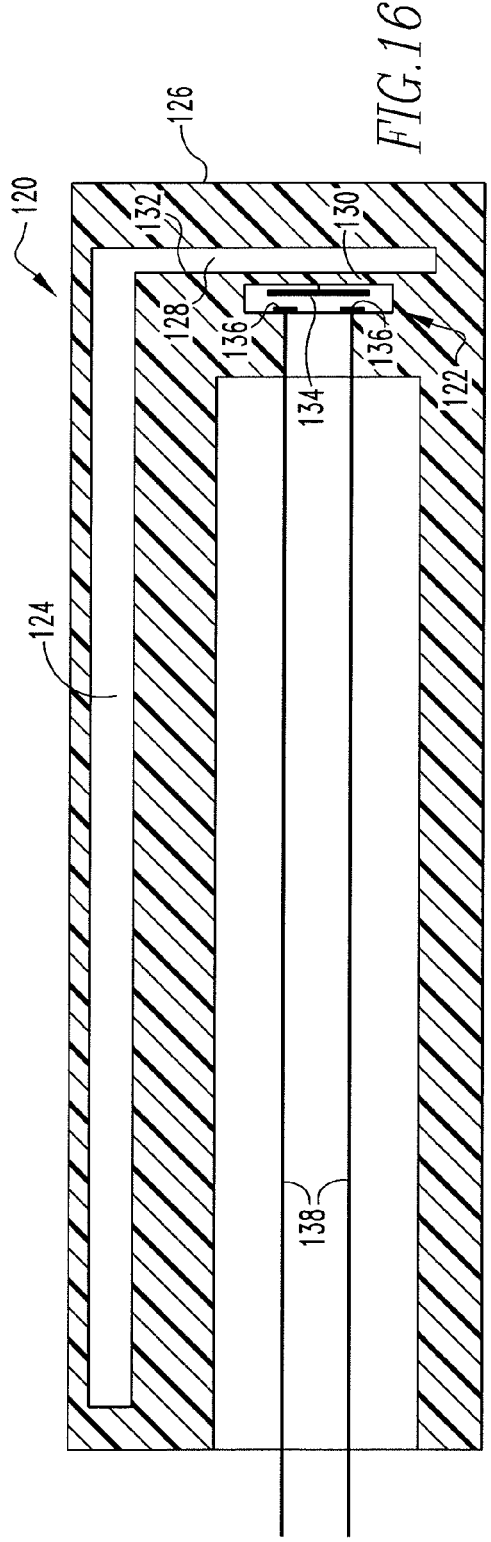
FIG. 16 is an enlarged sectioned elevational view of the compressible sleeve shown in FIG. 14.
Figure 17:
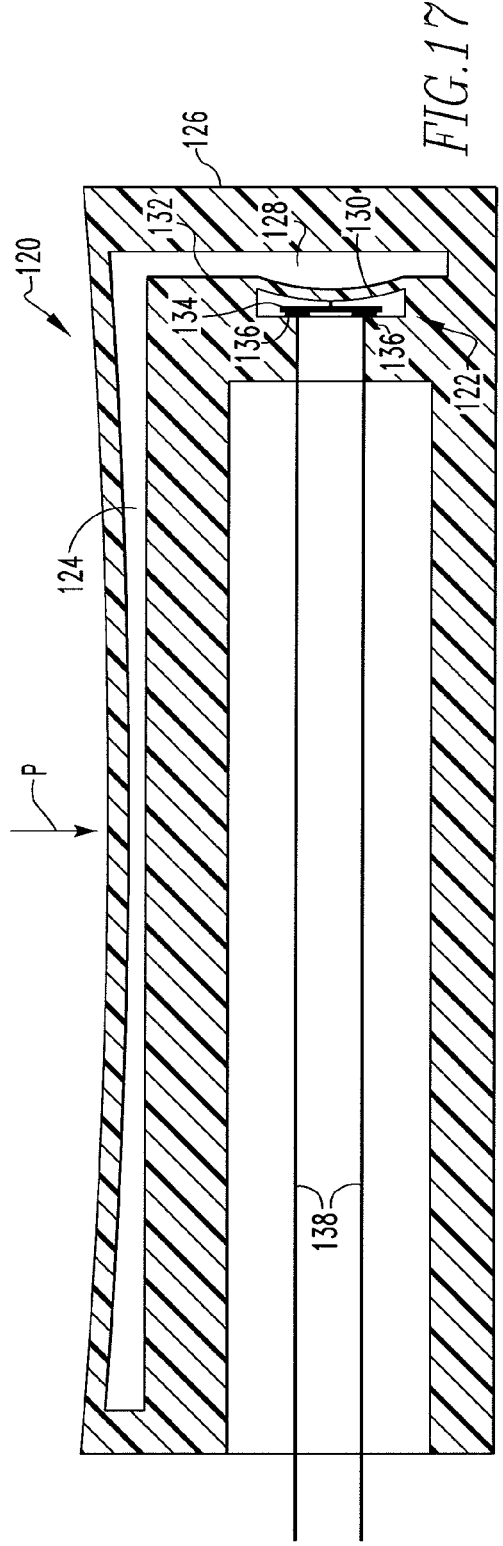
FIG. 17 is an enlarged sectioned elevational view of the compressible sleeve shown in FIG. 14 showing portions displaced in an alternate position.

The system shown in FIGS. 14-17 includes a first handle member 120 that may be mounted on a piece of equipment, such as for example, a handlebar 118 as shown in FIGS. 14 and 15. First handle member 120 includes a fluid cavity 124 extending at least along a portion of the length of handle 120, and extending around at least a portion of the circumference of handle 120, such as shown in FIG. 15. A fluid, such as preferably a synthetic motor oil, as previously discussed, is provided inside fluid cavity 124. Distal end 126 of first handle member 120 includes a manifold or reservoir 128 in flow connection with the fluid cavity 124, allowing flow from the fluid cavity 124 to reservoir 128 in distal end 126 of handle 120. Flexible diaphragm 130 extends across at least a portion of an internal side 132 of reservoir 128. As a result of the closed system, diaphragm 130 is moved inwardly and outwardly in response to increases and decreases in the manual pressure P (FIG. 17) applied to handle 120, such as shown in FIGS. 16 and 17.

Electric switch 122 of first handle member 120 includes a switch plate 134 which is coupled to diaphragm 130 opposite reservoir 128 and a pair of switch contacts 136. As shown in FIG. 16, switch plate 134 is generally positioned out of contact with switch contacts 136 when no external pressure is applied to fluid cavity 124. When manual pressure is applied to fluid cavity 124, such as shown in FIG. 17, the fluid is pressurized throughout the system and diaphragm 130 pushes switch plate 134 into contact with switch contacts 136 closing switch 122. When manual pressure is released, switch contacts 136 break contact with switch plate 134 as diaphragm 130 returns to its normal position, such as shown in FIG. 16, and the switch is opened. The system described herein allows for only a minimal pressure P to be required to cause electric switch 122 to close. Such minimal pressure may, for example, be provided by light pressure exerted by a single fingertip.

In the embodiment shown in FIGS. 16 and 17, electric switch 122 is connected by first wires 138 as part of an operative electrical circuit of the equipment. Electric switch 122 is positioned such that when electric switch 122 is closed, the circuit is closed and thus operable, and when electric switch 122 is open, the circuit is open and thus inoperable. Such operative electrical circuit may be coupled to one or more functions of the equipment (e.g., without limitation, power take off, engine, or any other function desired to be rendered operable or inoperable based on operator presence).

Figure 18:
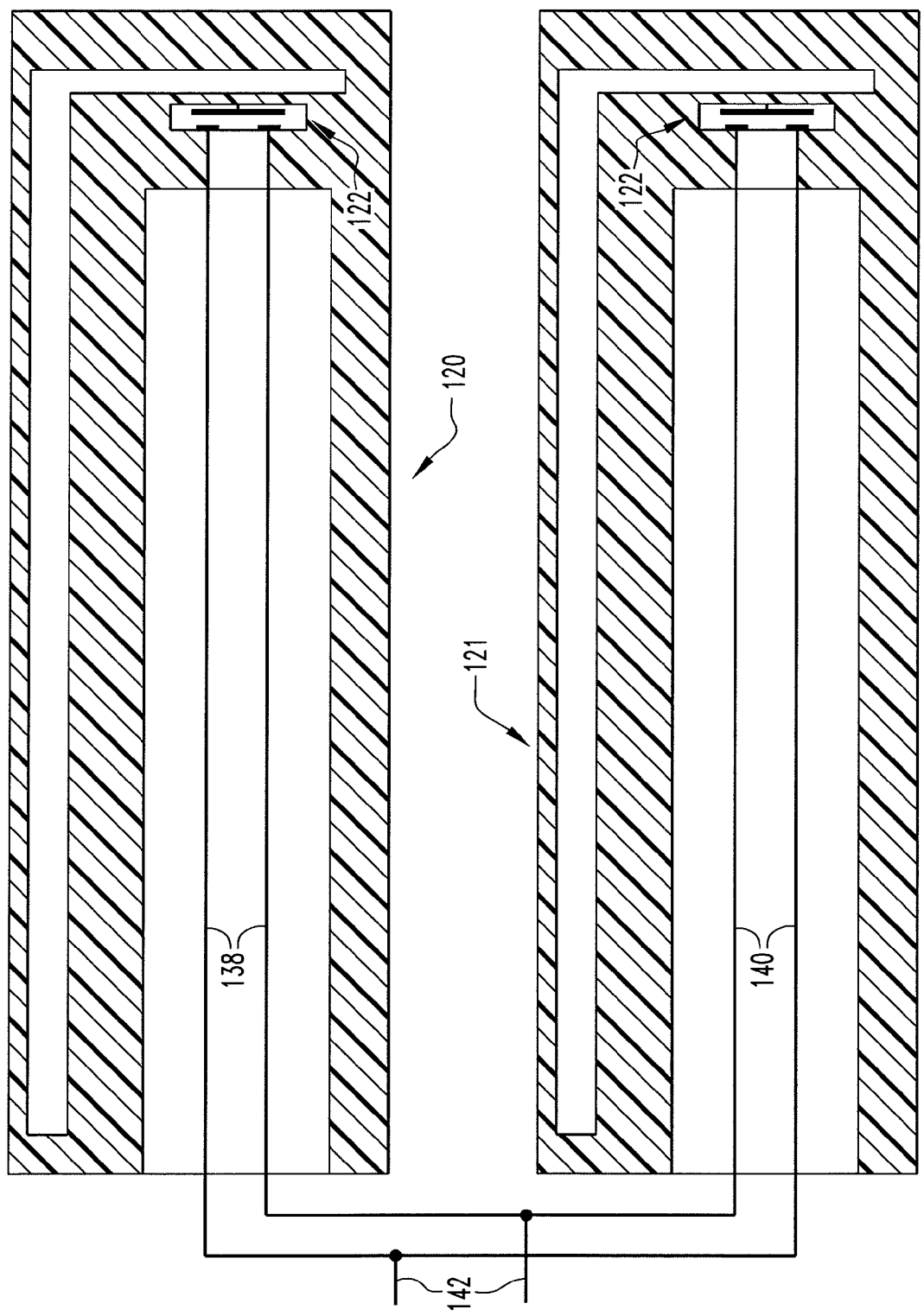
FIG. 18 is a perspective view of a further embodiment of an operator presence control and fail-safe system of the present invention utilizing two compressible sleeves, each having an internal electrical switch.

In the embodiment shown in FIG. 18, each of the electrical switches 122 of the first handle member 120 and the second handle member 121 have wires 138 and 140 running therefrom. Such wires 138 and 140 may be joined in parallel at common points (not numbered) to common wires 142, such as shown in FIG. 18, which are part of an operable circuit of the equipment. In such arrangement, application of pressure to either the first handle member 120 or the second handle member 121 would result in closing of the corresponding electrical switch 122 and thus closing of the circuit, rendering the associated functionality of the equipment operable. Although not depicted, it is to be readily appreciated that the electrical switches 122 of the first handle member 120 and the second handle member 121 could also be wired in series such that pressure would need to be applied to both the first handle member 120 and the second handle member 121 in order to render the circuit operable.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof. Furthermore, while the handle member and system have been described particularly in connection with riding or walk-behind lawn mowers, it is to be appreciated that use of the handle member and system is not intended to be limited to such applications as the invention could readily be applied to other mechanical equipment.

What is claimed is:

1. A handle member for use with an operator presence control and safety system for walk-behind and riding equipment, the handle member comprising:
    a flexible housing having an inner portion structured to be disposed around a portion of a rigid handlebar of the equipment and an outer portion adapted to be engaged by an operator of the equipment;
    an internal fluid flow channel formed in the flexible housing containing a fluid therein, the fluid flow channel being closed to the environment; and
    an electrical switch mounted in the housing adjacent the fluid flow channel and interacting therewith, the first electrical switch being in physical communication with the fluid flow channel so that pressure variances transmitted by the fluid within the fluid flow channel as a result of manual compression of a portion of the housing are conveyed through the internal fluid flow channel to the first electrical switch thereby actuating the first electrical switch for enabling operation of one or more functions of the equipment.

2. The handle member of claim 1 wherein the electrical switch comprises:
    a switch plate;
    a flexible diaphragm formed as a portion of the flexible housing adjacent the switch plate; and
    a pair of contacts,
    wherein the diaphragm moves the switch plate into and out of contact with the pair of contacts in response to the application and release of pressure to the handle member.

3. The handle member of claim 1 wherein the electrical switch comprises wires extending therefrom, the wires being structured to provide a signal of opening and closing of the first electrical switch to an electrical circuit of the equipment.

4. The handle member of claim 1 wherein the internal fluid flow channel comprises a reservoir portion in fluid flow communication with the internal fluid flow channel, the reservoir having a flexible diaphragm forming a portion of a side of the reservoir; and wherein the electrical switch is disposed adjacent the diaphragm such that movement of the diaphragm in response to pressure changes in the fluid causes the first electrical switch to open or close.

5. The handle member of claim 1 wherein the flexible housing is generally circular in cross-section and wherein the fluid flow channel extends around at least a portion of the circumference of the generally circular cross section.

6. The handle member of claim 1 wherein the fluid flow channel is structured to be disposed between the portion of the rigid handlebar and an operator contacting surface of the flexible housing.

7. The handle member of claim 1 wherein the electrical switch is normally in an open position whereupon application of pressure directly against an outer portion of the flexible housing by an operator increases the pressure of the fluid within the internal fluid flow channel and thereby transmits the fluid pressure increase to the electrical switch causing the switch to close thus enabling the one or more functions of the equipment; and wherein release of the applied pressure causes the fluid pressure to return to its normal level resulting in the opening of the switch and an immediate halt to the one or more functions of the equipment.

8. The handle member of claim 7 wherein any failure of the fluid flow channel will cause the electrical switch to revert to the normally open position.

9. The handle member of claim 1 wherein the flexible housing is structured to be removably secured to the handlebar.

10. The handle member of claim 9 wherein the flexible housing is removably secured to the handlebar via a slip fit.

* * * * *